United States Patent
Wang et al.

(10) Patent No.: US 10,627,698 B2
(45) Date of Patent: Apr. 21, 2020

(54) DISPLAY DEVICE AND METHOD FOR CONTROLLING A DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Fei Wang, Beijing (CN); Xue Dong, Beijing (CN); Dan Wang, Beijing (CN); Yun Qiu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 239 days.

(21) Appl. No.: 15/571,467

(22) PCT Filed: Apr. 1, 2017

(86) PCT No.: PCT/CN2017/079273
§ 371 (c)(1),
(2) Date: Nov. 2, 2017

(87) PCT Pub. No.: WO2018/076610
PCT Pub. Date: May 3, 2018

(65) Prior Publication Data
US 2019/0129274 A1    May 2, 2019

(30) Foreign Application Priority Data
Oct. 31, 2016 (CN) .......................... 2016 1 0929705

(51) Int. Cl.
*G02F 1/29* (2006.01)
*F21V 8/00* (2006.01)
(Continued)

(52) U.S. Cl.
CPC .............. *G02F 1/29* (2013.01); *G02B 6/005* (2013.01); *G02B 6/0053* (2013.01);
(Continued)

(58) Field of Classification Search
None
See application file for complete search history.

(56) References Cited

U.S. PATENT DOCUMENTS

2008/0002101 A1    1/2008  Akiyama
2010/0220048 A1    9/2010  Yamamura et al.
(Continued)

FOREIGN PATENT DOCUMENTS

CN        1797074 A        7/2006
CN      101604510 A       12/2009
(Continued)

OTHER PUBLICATIONS

Office Action received for Chinese Patent Application No. 201610929705.0, dated Aug. 17, 2017, 9 pages (4 pages of English Translation and 5 pages of Office Action).
(Continued)

*Primary Examiner* — Elmito Breval
(74) *Attorney, Agent, or Firm* — Womble Bond Dickinson (US) LLP (57) ABSTRACT

The present application relates to a display device, comprising a backlight source, a liquid crystal lens layer having a plurality of lens units arranged in a matrix, and a lens controller, wherein the backlight source comprises light sources of three different colors, wherein light sources of each color are lit up and turned off circularly, wherein only a light source of one color is lit up at a same moment, wherein the lens controller is configured to control a matching degree between a turn-on time of each lens unit and a light-up time of the light sources, so as to make selection of
(Continued)

quantity of light transmitted by the turned-on lens unit, and the lens controller is further configured to enable light exit directions of the plurality of lens units to be converged in an imaging area in front of the display device for imaging display.

12 Claims, 4 Drawing Sheets

(51) Int. Cl.
  *G06F 3/01*     (2006.01)
  *G02F 1/133*    (2006.01)
  *G09G 3/36*     (2006.01)
  *G02F 1/13357*   (2006.01)

(52) U.S. Cl.
  CPC ....... *G02B 6/0068* (2013.01); *G02F 1/13306* (2013.01); *G02F 1/133621* (2013.01); *G06F 3/013* (2013.01); *G09G 3/36* (2013.01); *G02F 2001/133622* (2013.01); *G02F 2203/30* (2013.01); *G09G 2310/0235* (2013.01)

(56) References Cited

U.S. PATENT DOCUMENTS

| | | |
|---|---|---|
| 2010/0238276 A1 | 9/2010 | Takagi et al. |
| 2013/0208196 A1* | 8/2013 | Kim .................. G02F 1/134309 349/15 |
| 2014/0055693 A1* | 2/2014 | Nam ....................... G02B 27/22 349/15 |
| 2014/0176835 A1 | 6/2014 | Hayashi |
| 2014/0253832 A1* | 9/2014 | Lee .................... G02F 1/133788 349/15 |
| 2015/0131012 A1* | 5/2015 | Jang ................... G02B 27/2214 349/15 |
| 2015/0269893 A1* | 9/2015 | Wu ..................... G02B 27/2214 345/419 |
| 2016/0161754 A1* | 6/2016 | Hyodo .............. G02F 1/134309 349/193 |
| 2016/0195739 A1* | 7/2016 | Choi ..................... G02F 1/1345 349/37 |
| 2016/0275875 A1 | 9/2016 | Wei |
| 2017/0110043 A1 | 4/2017 | Liu et al. |
| 2017/0115491 A1* | 4/2017 | Shi ..................... G02B 27/0172 |

FOREIGN PATENT DOCUMENTS

| | | |
|---|---|---|
| CN | 102057420 A | 5/2011 |
| CN | 103782228 A | 5/2014 |
| CN | 104732168 A | 6/2015 |
| CN | 104820315 A | 8/2015 |
| CN | 105116617 A | 12/2015 |
| CN | 106324878 A | 1/2017 |

OTHER PUBLICATIONS

Office Action received for Chinese Patent Application No. 201610929705.0, dated Apr. 26, 2017, 14 pages (8 pages of English Translation and 6 pages of Office Action).

International Search Report received for PCT Patent Application No. PCT/CN2017/079273, dated Jul. 10, 2017, 6 pages (2 pages of English Translation and 4 pages of Original Document).

Chinese Search Report received for CN Patent Application No. 201610929705.0, dated Feb. 28, 2017, 7 pages of Original Document Only.

* cited by examiner

S1: lighting up and turning off light sources of each color circularly, wherein only a light source of one color is lit up at a same moment S2: controlling a matching degree between a turn-on time period of each lens unit and a light-up time period of the light sources, so as to control quantity of light transmitted by the turned-on lens unit S3: controlling, by the lens controller, light exit directions of the plurality of lens units to be converged in an imaging area in front of the display device for imaging display

Fig. 9

DISPLAY DEVICE AND METHOD FOR CONTROLLING A DISPLAY DEVICE

RELATED APPLICATIONS

The present application is the U.S. national phase entry of the international application PCT/CN2017/079273, with an international filing date of Apr. 1, 2017, which claims priority of the Chinese patent application No. 201610929705.0 filed on Oct. 31, 2016, all contents of which are incorporated herein by reference.

TECHNICAL FIELD

The present application relates to the technical field of display, particularly to a display device and a method for controlling a display device.

BACKGROUND

The liquid crystal display in the prior art generally has components of a backlight module, a liquid crystal cell, a color filter, a polarizer etc., and always has a very large visual angle, which cannot meet the requirement on anti-peeping property in some cases. In addition, the liquid crystal display in the prior art needs a color filter to realize color display, and thus it has disadvantages in brightness. Therefore, an improved display device is required to solve the above problem.

SUMMARY

In view of the above problem, the present application proposes a display device and a method for controlling a display device.

In an aspect, a display device is proposed, comprising a backlight source, a liquid crystal lens layer having a plurality of lens units arranged in a matrix, and a lens controller. The backlight source comprises light sources of three different colors. Light sources of each color are lit up and turned off circularly. Only a light source of one color is lit up at a same moment. The lens controller is configured to control a matching degree between a turn-on time of each lens unit and a light-up time of the light sources, so as to control quantity of light transmitted by the turned-on lens unit, and the lens controller is further configured to enable light exit directions of the plurality of lens units to be converged in an imaging area in front of the display device for imaging display.

The display device can realize color display without a color filter, and has the advantages of high brightness and low power consumption, and additionally has an anti-peeping function.

In some embodiments, the display device further comprises an eye tracking system. The eye tracking system detects a position of viewer eyes, and the liquid crystal lens controller is configured to enable the imaging area to be located at the detected position of the viewer eyes based on feedback information of the eye tracking system. A better anti-peeping effect can be achieved by tracking the eyes.

In some embodiments, the backlight source further comprises a light guide plate.

In some embodiments, the light guide plate comprises a light entrance face, a reflecting bottom face, a first reflecting side face and a second reflecting side face, a light exit face disposed opposite to the reflecting bottom face. Light incident from the light entrance face is emitted towards the first reflecting side face and reflected to the second reflecting side face by the first reflecting side face, then is emitted towards the reflecting bottom face after being reflected by the second reflecting side face, and is emitted out from the light exit face after being reflected by the reflecting bottom face. The light guide plate according to the embodiment of the present invention has excellent light guiding efficiency and has perfect display uniformity and brightness.

In some embodiments, the first reflecting side face has a plurality of prism structures. The plurality of prism structures are configured to convert light from an external light source into light uniformly distributed on the second reflecting side face.

In some embodiments, the reflecting bottom face is provided with a prism array so as to emit light from the second reflecting side face out from the light exit face of the light guide plate.

In some embodiments, the light entrance face is disposed opposite to the light sources of three different colors.

In some embodiments, the lens controller is configured to adjust an overlapping range between the turn-on time of each lens unit and the light-up time of the light source of a corresponding color, so as to control gray scale of a displayed color.

In some embodiment, the liquid crystal lens layer comprises a first substrate, a first electrode array, a liquid crystal layer, a second electrode array and a second substrate, so as to constitute a plurality of lens units distributed in a matrix.

In another aspect, a method for controlling a display device is proposed. The display device comprises a backlight source, a liquid crystal lens layer comprising a plurality of lens units and a liquid crystal lens controller. The backlight source comprises light sources of three different colors. The method comprises the steps of: lighting up and turning off light sources of each color circularly, wherein only a light source of one color is lit up at a same moment; controlling a matching degree between a turn-on time of each lens unit and a light-up time of the light sources, so as to control quantity of light transmitted by the turned-on lens unit; controlling, by the lens controller, light exit directions of the plurality of lens units to be converged in an imaging area in front of the display device for imaging display.

In some embodiments, the display device further comprises an eye tracking system, and the method further comprises: detecting a position of viewer eyes through the eye tracking system; and enabling the imaging area to be located at the position of the viewer eyes based on feedback information of the eye tracking system through the liquid crystal lens controller.

In some embodiments, the step of controlling a matching degree between a turn-on time of each lens unit and a light-up time of the light sources, so as to control quantity of light transmitted by the turned-on lens unit comprises: enabling the turn-on time of each lens unit to partly or completely overlap with the light-up time of the light source of a single color or the light sources of multiple colors, so as to enable light of the light source of a corresponding color to be transmitted and viewed by the viewer.

In some embodiments, the step of controlling a matching degree between a turn-on time of each lens unit and a light-up time of the light sources, so as to control quantity of light transmitted by the turned-on lens unit further comprises: adjusting an overlapping range between the turn-on time of each lens unit and the light-up time of a light source of a corresponding color, so as to control gray scale of a displayed color.

In another aspect, an electronic equipment is proposed. The electronic equipment comprises the display device according to any one of the above mentioned embodiments.

By means of the display device and the method for controlling the display device proposed in the present application, the display device can be anti-peeping, and the display device further has the advantages of high brightness and low power consumption, and additionally can also realize color display without a conventional color filter.

BRIEF DESCRIPTION OF THE DRAWINGS

Drawings are included so as to provide further understanding to the embodiments and the drawings are incorporated into the specification to constitute a part of the specification. The drawings illustrate the embodiments and are used for explaining the principle of the present invention along with the description. It would be easy to recognize other embodiments and many expected advantages of the embodiments, because they would be understood better by citation of the following detailed description. The elements in the drawings are not necessarily in proportion. The same reference sign represents corresponding similar components.

DETAILED DESCRIPTION OF THE INVENTION

In the following detailed description, references are made to the drawings, the drawings form a part of the detailed description, and are shown through specific illustrative embodiments in which the present invention can be carried out. In this regard, references are made to the orientations of the described drawings to use the directional terms, such as "top", "bottom", "left", "right", "upper", "lower" etc. Because the components of the embodiments can be positioned in several different orientations, the directional terms are used for illustration rather than limitation. It should be understood that other embodiments can be used or logical changes can be made without departing from the scope of the present invention. Hence, the following detailed description should not be adopted in the sense of limitation, and the scope of the present invention is defined by the claims attached.

Figure 1:
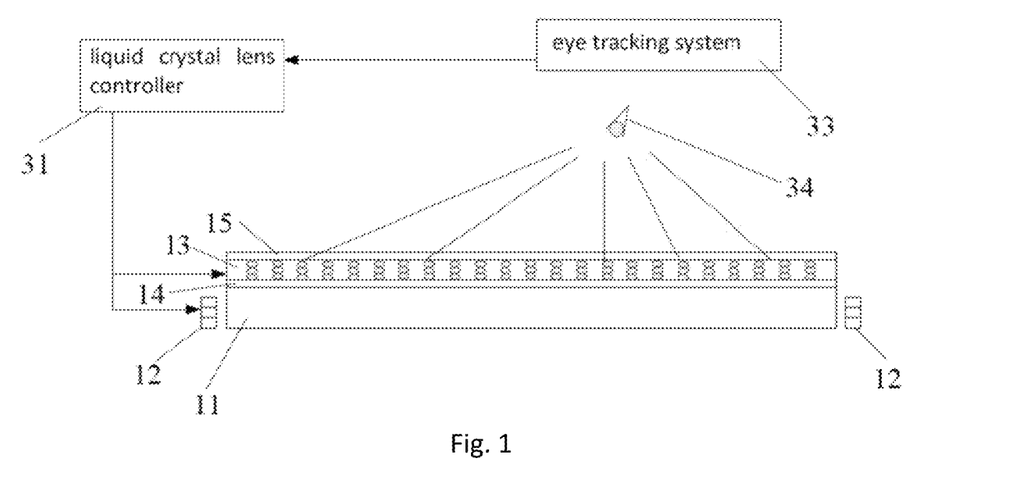
FIG. 1 shows a structural schematic diagram of main components of a display device according to an embodiment of the present invention.

FIG. 1 shows a structural schematic diagram of main components of a display device according to an embodiment of the present invention. The display device mainly comprises a backlight source (11, 12), a liquid crystal lens layer 13 having a plurality of lens units and a liquid crystal lens controller 31. The backlight source comprises light sources of three different colors. The light sources of each color are lit up and turned off circularly. Only a light source of one color is lit up at the same moment. The lens controller 31 is configured to control matching between the turn-on time of each lens unit and the light-up time of the light source, so as to control the quantity of light transmitted by the turned-on lens unit. It should be recognized that the backlight source can also use a white light source, so as to realize black and white display.

The lens controller 31 is further configured to enable the light exit directions of the plurality of lens units to be converged in an imaging area in front of the display device, for example, an area where an eye 34 locates. Thus, the display device achieves the purpose of anti-peeping. The content displayed on the display device cannot be viewed if the display device is viewed from other areas except for the imaging area.

In some specific examples, the display device can further comprise an eye tracking system 33. The eye tracking system 33 tracks a position of the viewer eyes, so as to provide feed back to the liquid crystal lens controller 31. The liquid crystal lens controller is configured to enable the imaging area to be located at the detected position of the viewer eyes based on the feedback information of the eye tracking system, wherein the feedback information of the eye tracking system includes the position information of the viewer eyes etc. The liquid crystal lens controller 31 enables the imaging area to be located at the detected position of the viewer eyes (such as the position indicated by the reference sign 34) while controlling turn-on of the liquid crystal lens in a time-division mode so as to realize pixel display. This can adjust the imaging area in real time based on the variation of the position of the viewer, so as to achieve a better anti-peeping purpose. The eye tracking system herein can use the prior art eye tracking system, which will not be described in detail here.

The backlight source further comprises a light guide plate 11 specifically. The light source of the backlight source is an LED light source 12. The LED light source 12 for example comprises LEDs of three colors of red, green, and blue. The light guide plate comprises a light entrance face, a reflecting bottom face, a first reflecting side face and a second reflecting side face, and a light exit face disposed opposite to the reflecting bottom face. The light incident from the light entrance face is emitted towards the first reflecting side face and reflected to the second reflecting side face by the first reflecting side face, then the light is emitted towards the reflecting bottom face after being reflected by the second reflecting side face, and is emitted out from the light exit face after being reflected by the reflecting bottom face. The light guide plate 11 is used for projecting the light emitted by the LED light source 12 to the liquid crystal lens unit uniformly, so as to realize a surface light source. Furthermore, the light entrance face of the light guide plate is disposed opposite to the light sources of three different colors. Optionally, the light guide plate is a collimated light guide plate, which can provide collimated light, thus the display effect of the display device can be improved.

The display device further comprises polarizers 14 and 15. The polarizers 14 and 15 implement the image display function in cooperation with the liquid crystal lens.

Figure 2:
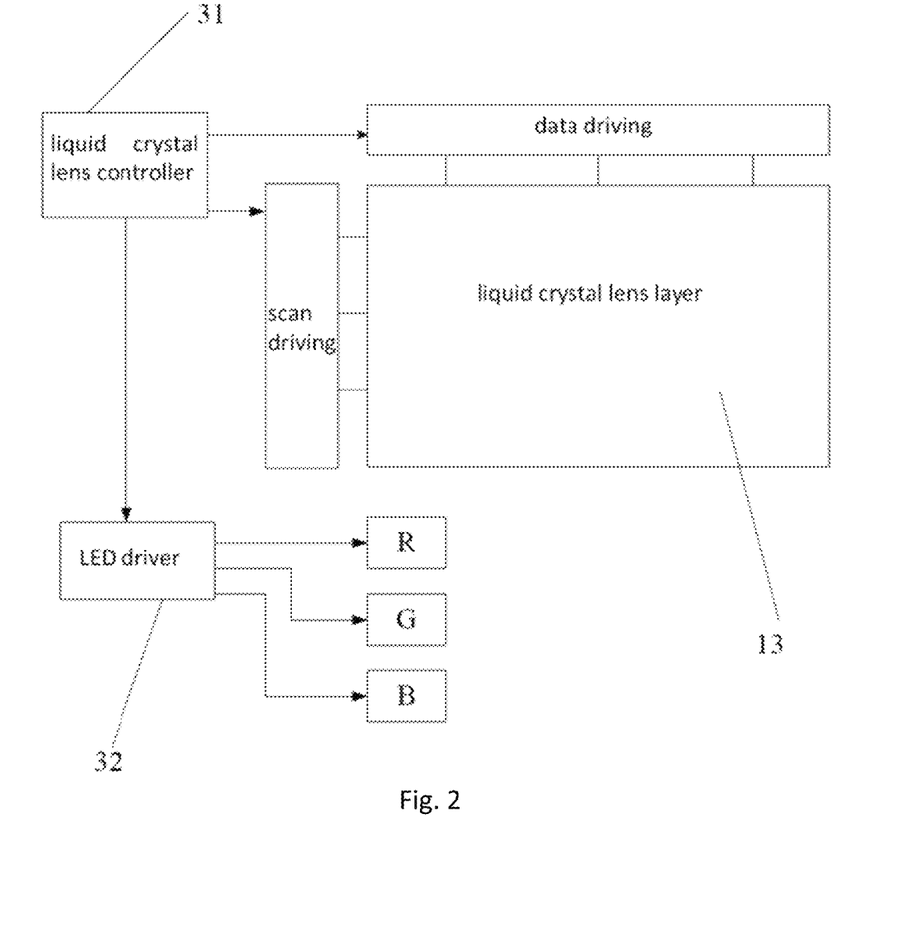
FIG. 2 shows a block diagram of principle of a display panel according to an embodiment of the present invention.

FIG. 2 shows a block diagram of principle of a display panel according to an embodiment of the present invention. From the figure it can be seen that the display panel according to an embodiment of the present invention controls the liquid crystal lens layer 13 through the liquid crystal lens controller 31. The liquid crystal lens controller 31 controls the lens units in the liquid crystal lens layer 13 by combining data driving and scan driving, and adjusts the focal length of the lens and the light exit direction. Moreover, the liquid crystal lens controller 31 further controls the three-color LED light source of RGB via an LED driver 32, so as to enable the liquid crystal lens layer 13 and the LED light source to cooperate with each other to realize color display.

Figure 3:
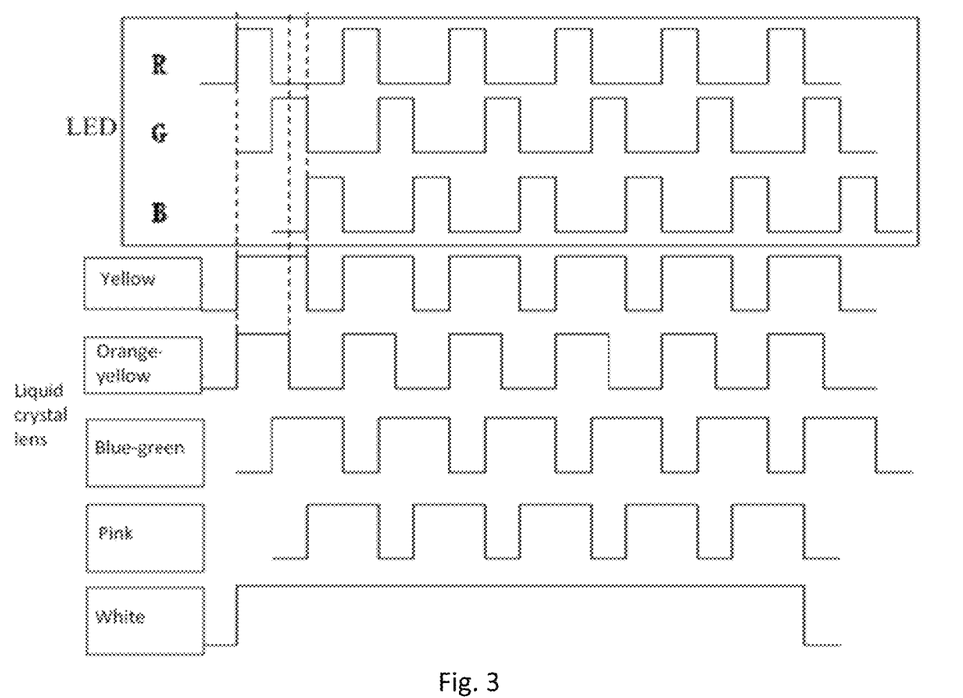
FIG. 3 shows a control timing diagram of a display panel according to an embodiment of the present invention.

FIG. 3 shows a control timing diagram of a display panel according to an embodiment of the present invention. This figure shows a control timing diagram of the LED and the liquid crystal lens when displaying a certain color using the display panel according to an embodiment of the present invention. The upper half part of this figure shows the light-up timing sequence of the red LED (R), the green LED (G) and the blue LED (B) in the LED light sources, wherein the high level represents being lit up, and the low level represents being turned off. It can be seen that R, G and B are lit up successively in a cycle repeated at a certain frequency, and the light-up time periods thereof are equal. Moreover, only LEDs of the same color are lit up at the same moment. That is, the LEDs of the same color share a light-up time period.

The lower half part of this figure shows the turn-up timing sequence of the liquid crystal lens with respect to different colors, wherein the high level represents that the liquid crystal lens is turned on, and the low level represents that the liquid crystal lens is turned off. It can be seen that the turn-on time period of the liquid crystal lens corresponds to one or more parts or all of each cycle. By using the color superposition effect of human eyes, for example, when the liquid crystal lens is turned on at the interval in which the red LEDs and green LEDs are lit up, the human eyes can see that the corresponding pixel of the liquid crystal lens presents yellow. Similarly, when the liquid crystal lens is turned on at the interval in which the blue LEDs and the green LEDs are lit up, the human eyes can see that the corresponding pixel of the liquid crystal lens presents blue-green. When the turn-on time period of the liquid crystal lens corresponds to the turn-on time period of the red LEDs and half of the turn-on time period of the green LEDs, the human eyes can observe orange-yellow. When the turn-on time period of the liquid crystal lens corresponds to the turn-on time period of the blue LEDs and red LEDs, the human eyes can observe pink. When the liquid crystal lens is turned on continuously in the whole cycle, the human eyes can observe white. The display of other colors can be deduced from this, i.e., the superposed color and brightness depend on: the turn-on time period of the liquid crystal lens corresponding to the light-up time periods of the three LEDs of RGB, and the proportion of the turn-on time period of the liquid crystal lens occupying the light-up time period.

Figure 4:
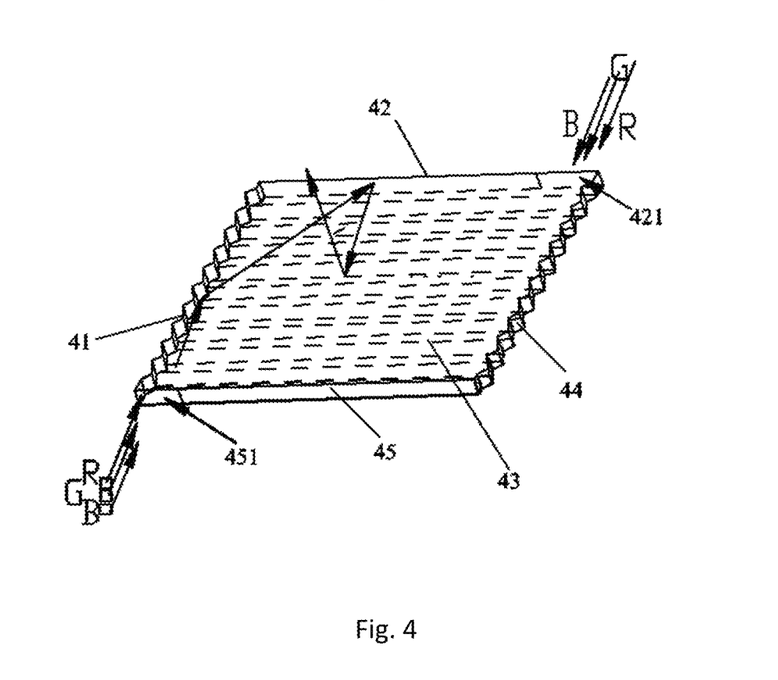
FIG. 4 shows a schematic diagram of an overall structure of a light guide plate according to an embodiment of the present invention.
Figure 6:
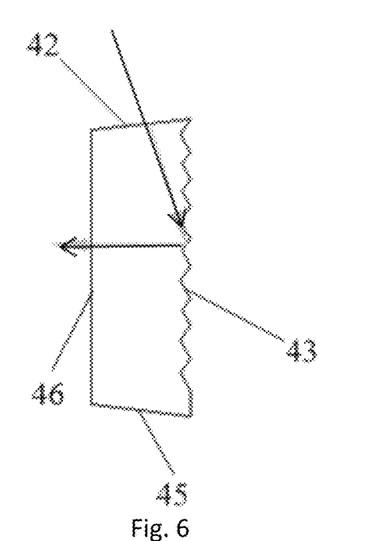
FIG. 6 shows a sectional schematic view of a light guide plate according to an embodiment of the present invention.

FIG. 4 shows a schematic diagram of an overall structure of a light guide plate according to an embodiment of the present invention. The light guide plate has a plate shape of parallelogram generally. The reflecting face 43 is the bottom face (i.e., the reflecting bottom face) of the light guide plate, the reflecting faces 41, 42, 44, 45 are four side faces of the light guide plate respectively. The reflecting faces 41, 44 are the first reflecting side faces, the reflecting faces 42, 35 are the second reflecting side faces. The reflecting faces 41, 44 both have a plurality of prism structures, and the prism reflects the incident light by coating a reflective coating or using the principle of total reflection. The plurality of prism structures are configured to convert the light from an external light source into light uniformly distributed on the second reflecting side face. The reflecting faces 42, 45 are both plane structures, and the ends of the reflecting faces 42, 45 respectively adjacent to the reflecting faces 44, 41 are provided with incident regions 441, 451 (i.e., the light entrance faces). In other words, the incident regions are located at segments of the second reflecting side face close to the acute angles of the parallelogram respectively. The incident regions 41, 42 are transparent, for the convenience of the light emitted by the external light source (e.g., the LEDs) entering the light guide plate. However, the regions other than the incident region of the reflecting faces 42, 45 all have reflectivity (for example, being realized by coating a reflective coating). The reflecting face 43 has prism structures arranged in an array form, so as to emit the light from the second reflecting side face out from the light exit face of the light guide plate. As shown in FIG. 6, the light guide plate has a light exit face 46. It should be noted that in FIG. 4 for example, there are two light incident faces, the light guide plate can also have only one light incident face. Arranging two light incident faces can further improve light exit brightness and uniformity of the backlight source.

Next, the light guide principle of the light guide plate according to an embodiment of the present invention will be explained by taking the diagram as shown in FIG. 4 as an example. The light from the external light source (e.g. the LEDs) enters the light guide plate 11 via the incident region 451, and is incident into the reflecting face 41. The reflecting face 41 has a plurality of prism structures. The plurality of prism structures in the reflecting face 41 reflects the incident light onto the reflecting face 42 uniformly. The reflecting face 42 then reflects the light onto the reflecting face 43 uniformly. The reflecting face 43 reflects the light upwards so as to enable it to exit the light guide plate and form a collimated surface light source. The light incident from the incident region 42 generally experiences the similar process as above; the difference only lies in that it is reflected onto the reflecting face 43 via the reflecting face 44 and the reflecting face 45 successively. Although FIG. 1 only schematically shows one light beam, it should be understood that the light incident from the incident region can be incident onto the whole reflecting faces 41 and 44, and be uniformly reflected to the regions on the whole reflecting faces 42 and 45 except for the incident region. In addition, the whole reflecting face 43 can also receive the light from the reflecting faces 42 and 45 uniformly.

Figure 5:
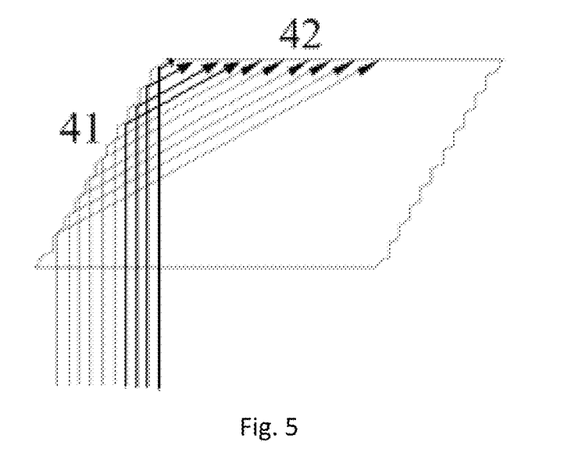
FIG. 5 shows a plane schematic view of a light guide plate according to an embodiment of the present invention.

FIG. 5 shows a plane schematic view of a light guide plate according to an embodiment of the present invention. From FIG. 5 it can be seen that the light guide plate generally has a shape of parallelogram. FIG. 5 schematically shows reflection of the light incident from the incident region on the first reflecting side face (such as 41). The angle of the prism in the first reflecting side face is adapted to enable the incident light to be uniformly reflected onto the second reflecting side face (such as 42). In some embodiments, each prism structure of the first reflecting side face has three segments with different prism inclination angles, so as to match different incident positions of the red LED, green LED and blue LED respectively.

FIG. 6 shows a sectional schematic view of a light guide plate according to an embodiment of the present invention. FIG. 6 schematically shows reflection of the light reflected from the reflecting face 42 on the reflecting face 43. From FIG. 6 it can be seen that the reflecting face 42 and the reflecting face 45 are both slightly inclined towards the reflecting face 43, so as to enable the light to be reflected onto the reflecting face 43. The reflecting face 43 has a prism structure array in dense distribution. The prism structure array on the reflecting face 43 can reflect the incident light upwards uniformly, so as to enable the light guide plate to become a surface light source.

Figure 7:
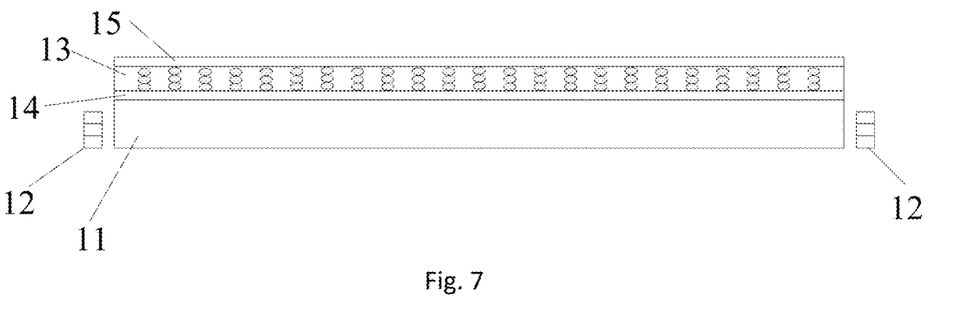
FIG. 7 shows a schematic diagram of a general structure of a display panel according to an embodiment of the present invention.

FIG. 7 shows a schematic diagram of a general structure of a display panel according to an embodiment of the present invention. The display panel mainly comprises the light guide plate 11 as stated above and a light source 12 located beside, as well as a liquid crystal lens layer 13 located above the light guide plate 11. A polarizer 14 is further arranged between the liquid crystal lens layer 13 and the light guide plate 11, and another polarizer 15 is further arranged above the liquid crystal lens layer 13. It can be seen that the display panel according to an embodiment of the present invention requires no color filter, but can also realize color display.

Figure 8:
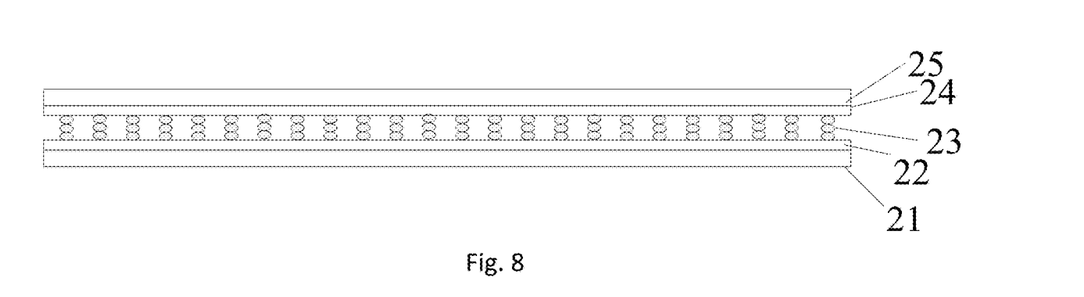
FIG. 8 shows a schematic diagram of a general structure of a liquid crystal lens layer according to an embodiment of the present invention.

FIG. 8 shows a schematic diagram of a general structure of a liquid crystal lens layer according to an embodiment of the present invention. The liquid crystal lens layer comprises a first substrate 21, a first electrode array 22, a liquid crystal layer 23, a second electrode array 24 and a second substrate 25. Thus the liquid crystal lens layer forms a plurality of lens units distributed in a matrix. The liquid crystal layer 23 in the liquid crystal lens layer can be deflected under the control of the electrode array, so as to enable the light to be transmitted in a desired manner. The electrode array is made of ITO (indium tin oxide) material. The electrode array can be controlled by a TFT array substrate (not shown in the figure). The TFT array substrate belongs to the prior art, which will not be described herein. The TFT array substrate can be used to control each of the plurality of lens units in the liquid crystal lens layer. The lens controller is further configured to adjust the overlapping arrange between the turn-on time of each lens unit and the light-up time of the light source of the corresponding color, so as to control the gray scale of the displayed color.

Figure 9:
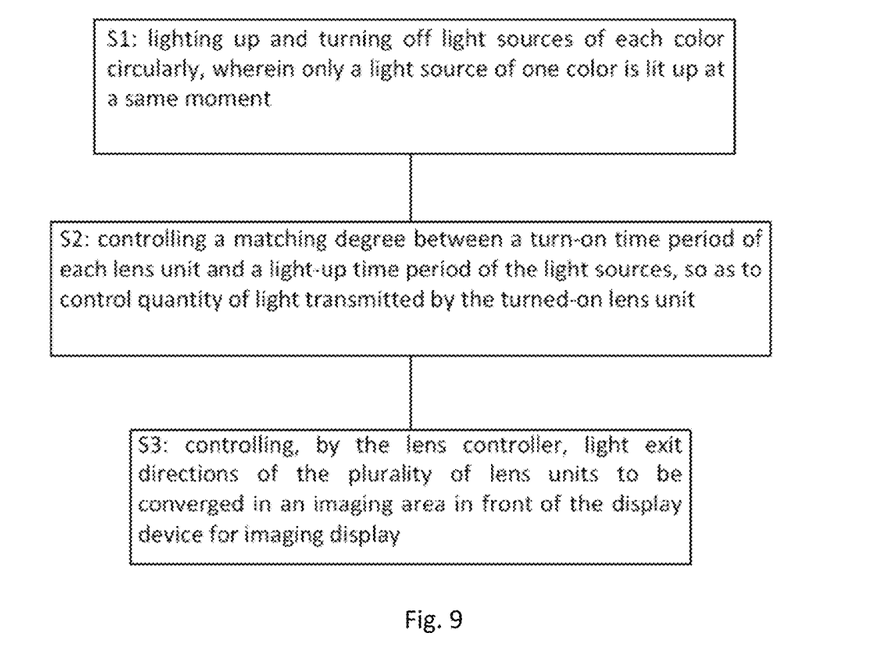
FIG. 9 shows a flow chart of a method for controlling a display device according to an embodiment of the present invention.

FIG. 9 shows a flow chart of a method for controlling a display device according to an embodiment of the present invention. The display device comprises a backlight source, a liquid crystal lens layer comprising a plurality of lens units, and a liquid crystal lens controller. The backlight source comprises light sources of three different colors. The method mainly comprises the following steps S1-S4.

At step S1, the light sources of each color are lit up and turned off circularly, wherein only a light source of one color is lit up at the same moment. This step realizes light emission of the backlight source in a time-division mode.

At step S2, the matching between the turn-on time period of each lens unit and the light-up time of the light source is controlled, so as to control the quantity of light transmitted by the turned-on lens unit. The turn-on time period of the lens unit overlaps with the light-up time of the light source, so as to control the quantity of light of the light source transmitted through the lens. Thus, color display can be realized in the display device without a color filter.

At step S3, the lens controller enables the light exit directions of the lens units to be converged in an imaging area in front of the display device. The anti-peeping display can be realized through this step.

In some optional embodiments, the method can further comprise the following additional step: detecting a position of viewer eyes through an eye tracking system; and enabling the imaging area to be located at the position of the viewer eyes through the liquid crystal lens controller. The imaging area of the display device can vary based on the variation of the position of the viewer eyes through this step, so as to achieve a better anti-peeping effect.

The step S2 can specifically comprise the following sub-step: enabling the turn-on time period of each lens unit to partly or completely overlap with the light-up time period of the light source of a single color or the light sources of multiple colors, so as to enable light of the light sources of a corresponding color to be transmitted.

In a further embodiment, the step S2 can further comprises the following sub-step: adjusting an overlapping range between the turn-on time period of each lens unit and the light-up time period of a light source of a corresponding color, so as to control gray scale of a displayed color.

In another aspect, an electronic equipment is proposed. The electronic equipment comprises the display device according to any one of the above mentioned embodiments.

It should be noted that although the method steps are shown in a certain order in the figure, it does not mean that the method steps must be performed in the shown order. On the contrary, they can be performed in an opposite or parallel order in the case of not departing from the spirit and the principle of the present invention.

The specific implementations of the present application have been described above, however, the protection scope of the present application is not limited to this. Any modifications or replacements that can be easily conceived by the skilled person familiar with the present technical field within the technical scope disclosed by the present invention should be covered within the protection scope of the present invention. Therefore, the protection scope of the present invention shall be subject to the protection scopes of the claims.

In the description of the present application, it should be understood that the orientation or positional relationships indicated by the terms "upper", "lower", "inside", "outside" and the like are orientation or positional relationships as shown in the figures, which are only for the convenience of describing the present application and simplifying the description, rather than indicating or implying that the device or element must have particular orientations or be constructed and operated in particular orientations, hence, they could not be understood as limitations to the present application. In addition, although the steps are listed in a certain order in the method claims, these steps are not necessarily performed in the listed order, on the contrary, they can be performed in an opposite or parallel manner in the case of not departing from the spirit and gist of the present invention. The wording "comprise" does not exclude presence of elements or steps not listed in the claims. The wording "a" or "one" before the elements does not exclude presence of a plurality of such elements. The simple fact that some measures are recited in mutually different dependent claims does not indicate that the combination of these measures cannot be used for improvement. Any reference signs in the claims should not be understood as limiting the scope.

The invention claimed is:

1. A display device, comprising: a backlight source, a liquid crystal lens layer having a plurality of lens units arranged in a matrix, and a lens controller;
wherein the backlight source comprises light sources of three different colors, light sources of each color are lit up and turned off circularly, and only a light source of one color is lit up at a same moment; wherein the lens controller is configured to control a matching degree between a turn-on time of each lens unit and a light-up time of the light sources, so as to control quantity of light transmitted by the turned-on lens unit, and the lens controller is further configured to enable light exit directions of the plurality of lens units to be converged in an imaging area in front of the display device for imaging display;

and wherein the backlight source further comprises a light guide plate; the light guide plate comprises a light entrance face, a reflecting bottom face, a first reflecting side face and a second reflecting side face, a light exit face disposed opposite to the reflecting bottom face; light incident from the light entrance face is emitted towards the first reflecting side face and reflected to the second reflecting side face by the first reflecting side face, then is emitted towards the reflecting bottom face after being reflected by the second reflecting side face, and is emitted out from the light exit face after being reflected by the reflecting bottom face.

2. The display device according to claim 1, further comprising an eye tracking system, wherein the eye tracking system detects a position of viewer eyes, and the liquid crystal lens controller is configured to enable the imaging area to be located at the detected position of the viewer eyes based on feedback information of the eye tracking system.

3. The display device according to claim 1, wherein the first reflecting side face has a plurality of prism structures, the plurality of prism structures are configured to convert light from an external light source into light uniformly distributed on the second reflecting side face.

4. The display device according to claim 1, wherein the reflecting bottom face is provided with a prism array so as to emit light from the second reflecting side face out from the light exit face of the light guide plate.

5. The display device according to claim 1, wherein the light entrance face is disposed opposite to the light sources of three different colors.

6. The display device according to claim 1, wherein the lens controller is configured to adjust an overlapping range between the turn-on time of each lens unit and the light-up time of the light source of a corresponding color, so as to control gray scale of a displayed color.

7. The display device according to claim 1, wherein the liquid crystal lens layer comprises a first substrate, a first electrode array, a liquid crystal layer, a second electrode array and a second substrate, so as to constitute a plurality of lens units distributed in a matrix.

8. An electronic equipment comprising a display device; the display device comprises: a backlight source, a liquid crystal lens layer having a plurality of lens units arranged in a matrix, and a lens controller;

wherein the backlight source comprises light sources of three different colors, light sources of each color are lit up and turned off circularly, and only a light source of one color is lit up at a same moment; wherein the lens controller is configured to control a matching degree between a turn-on time of each lens unit and a light-up time of the light sources, so as to control quantity of light transmitted by the turned-on lens unit, and the lens controller is further configured to enable light exit directions of the plurality of lens units to be converged in an imaging area in front of the display device for imaging display and wherein the backlight source further comprises a light guide plate; the light guide plate comprises a light entrance face, a reflecting bottom face, a first reflecting side face and a second reflecting side face, a light exit face disposed opposite to the reflecting bottom face; light incident from the light entrance face is emitted towards the first reflecting side face and reflected to the second reflecting side face by the first reflecting side face, then is emitted towards the reflecting bottom face after being reflected by the second reflecting side face, and is emitted out from the light exit face after being reflected by the reflecting bottom face.

9. The electronic equipment according to claim 8, further comprising an eye tracking system, wherein the eye tracking system detects a position of viewer eyes, and the liquid crystal lens controller is configured to enable the imaging area to be located at the detected position of the viewer eyes based on feedback information of the eye tracking system.

10. The electronic equipment according to claim 8, wherein the first reflecting side face has a plurality of prism structures, the plurality of prism structures are configured to convert light from an external light source into light uniformly distributed on the second reflecting side face.

11. The electronic equipment according to claim 8, wherein the lens controller is configured to adjust an overlapping range between the turn-on time of each lens unit and the light-up time of the light source of a corresponding color, so as to control gray scale of a displayed color.

12. The electronic equipment according to claim 8, wherein the liquid crystal lens layer comprises a first substrate, a first electrode array, a liquid crystal layer, a second electrode array and a second substrate, so as to constitute a plurality of lens units distributed in a matrix.

* * * * *